No. 654,226. Patented July 24, 1900.
T. CARROLL.
CASH REGISTER.
(Application filed Oct. 9, 1899.)
(No Model.) 8 Sheets—Sheet 1.

Witnesses
Wm. McCarthy
Wm. H. Muzzy

Inventor
Thomas Carroll
By Alvan Macauley
Attorney

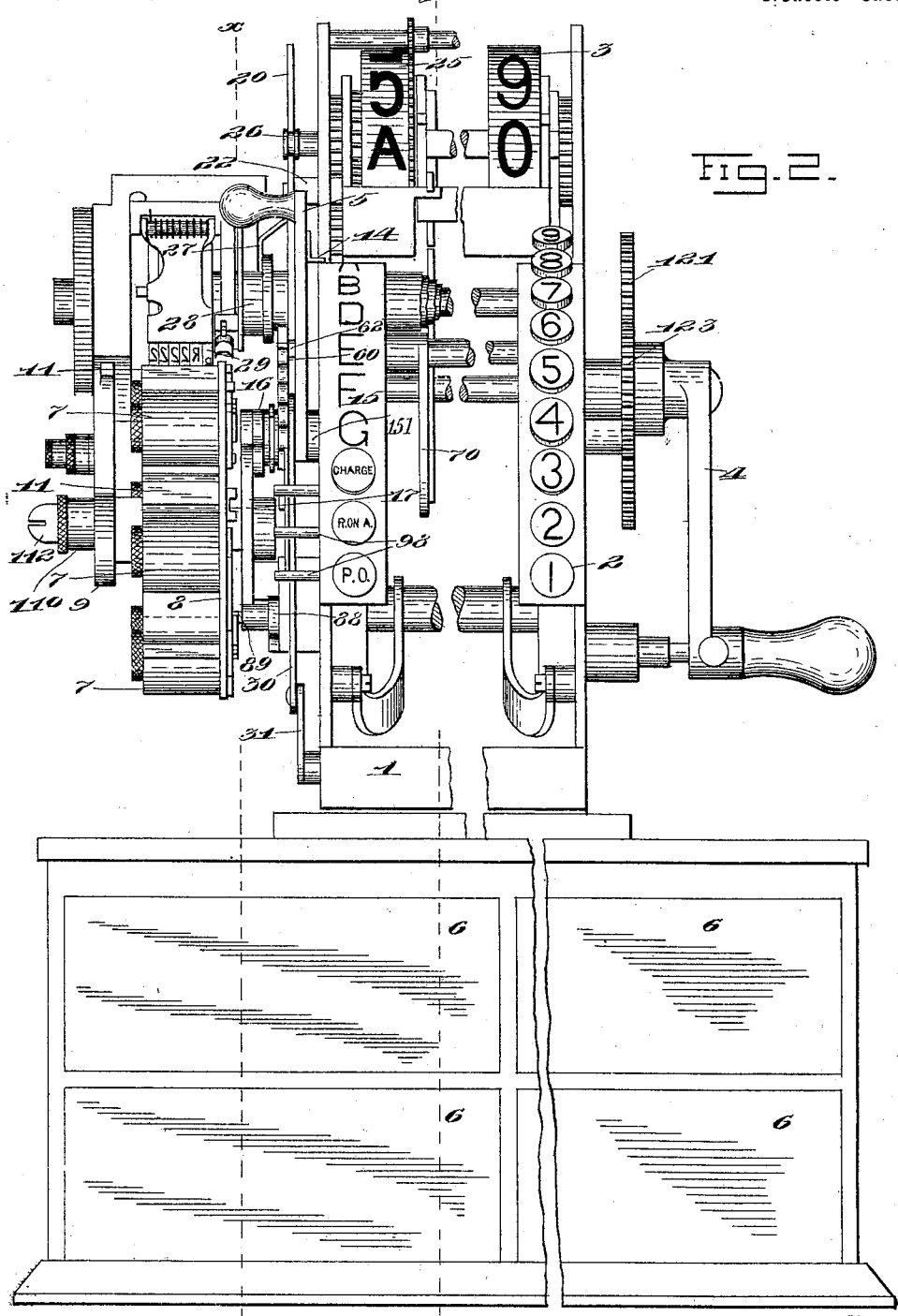

No. 654,226. Patented July 24, 1900.
T. CARROLL.
CASH REGISTER.
(Application filed Oct. 9, 1899.)
(No Model.) 8 Sheets—Sheet 3.
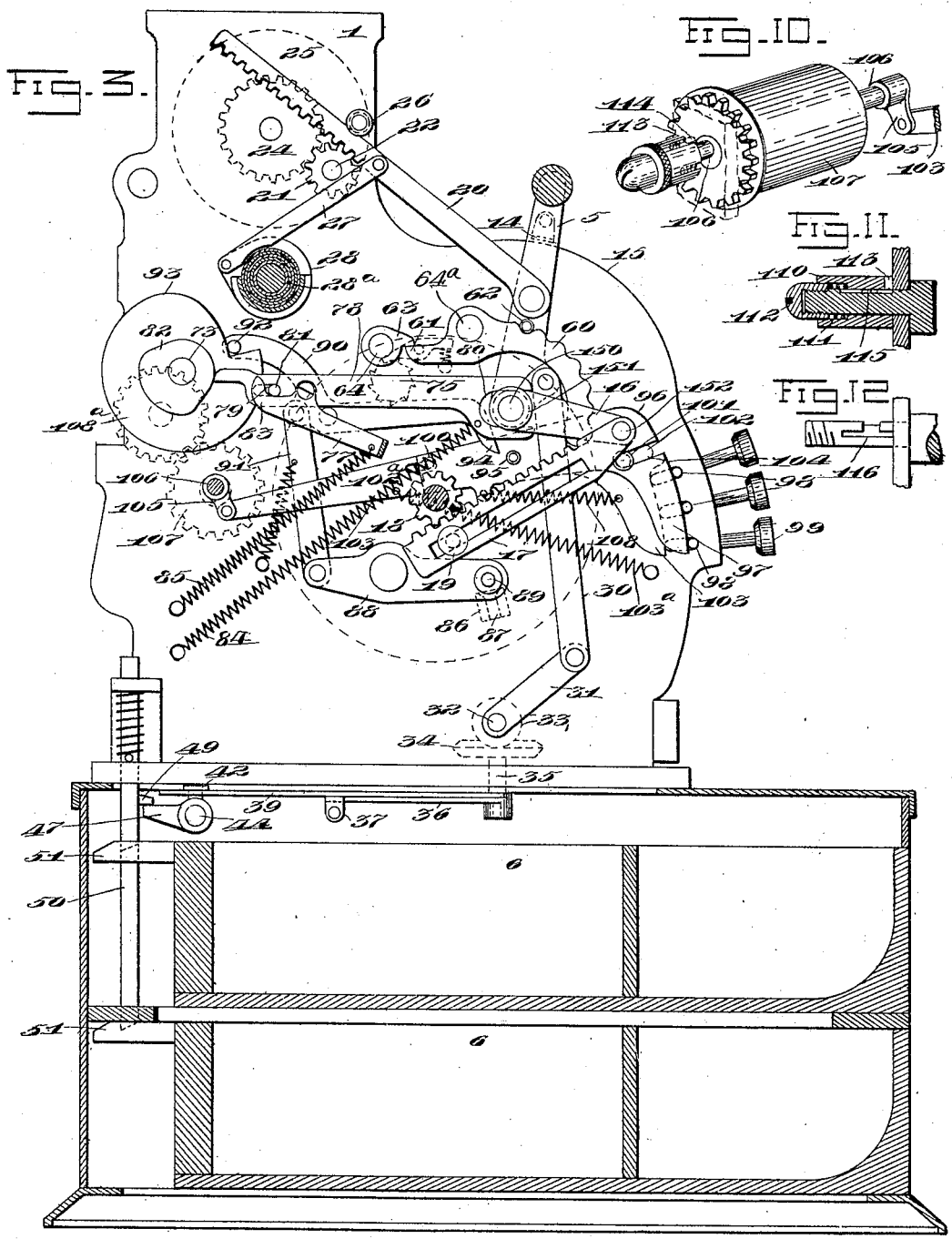
Witnesses
Wm McCarthy
Wm H Huzzy
Inventor
Thomas Carroll
By Alvan Macauley
Attorney

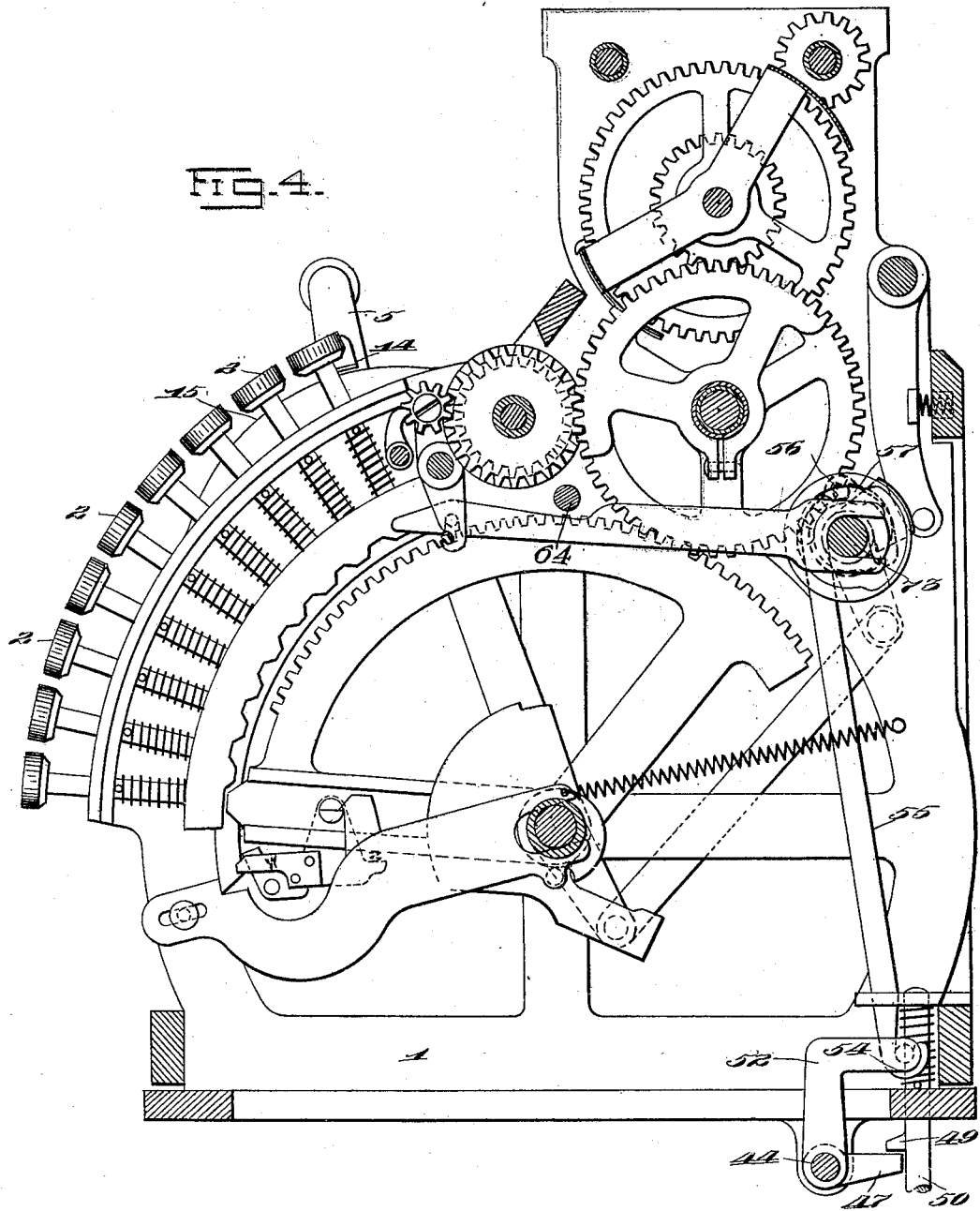

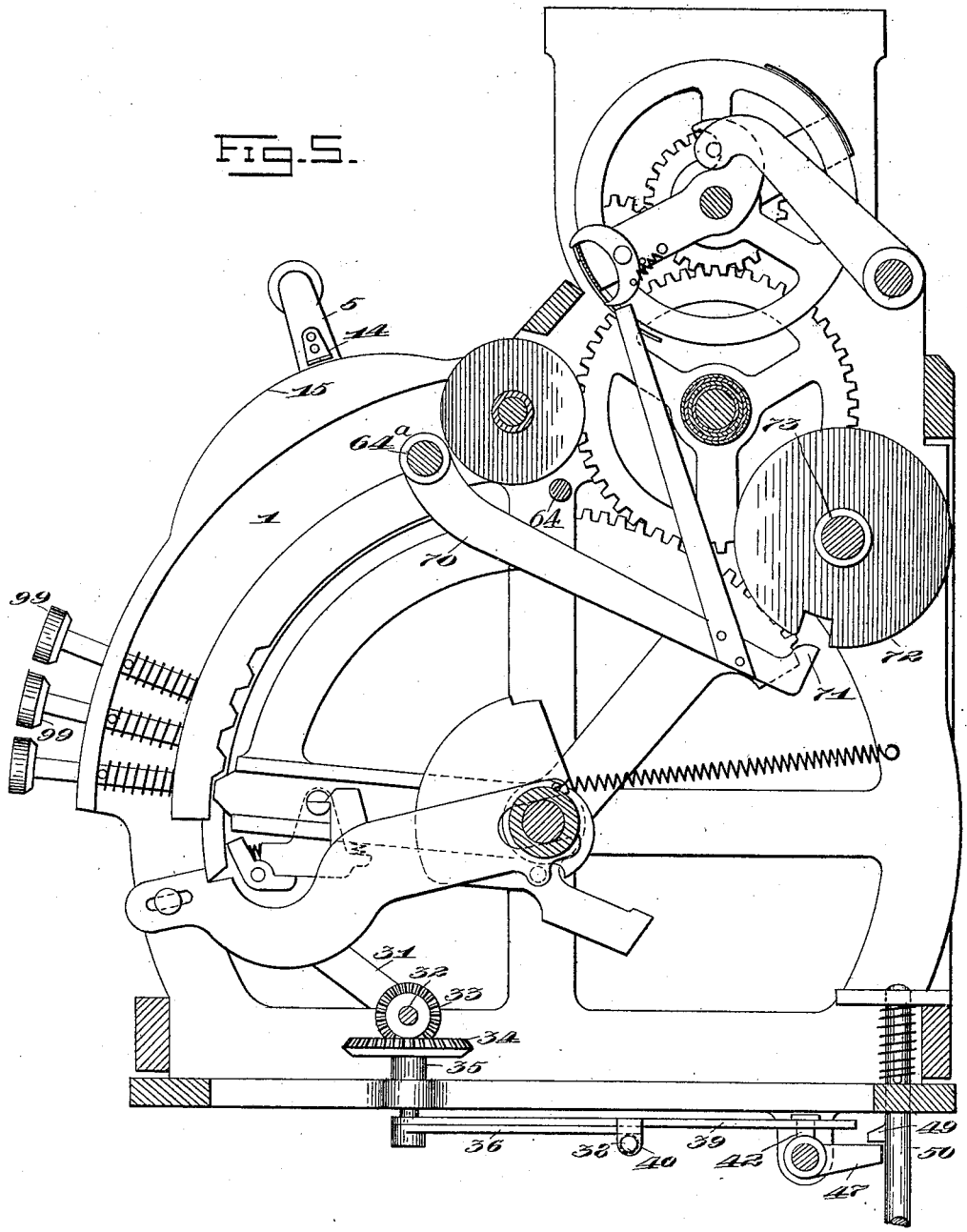

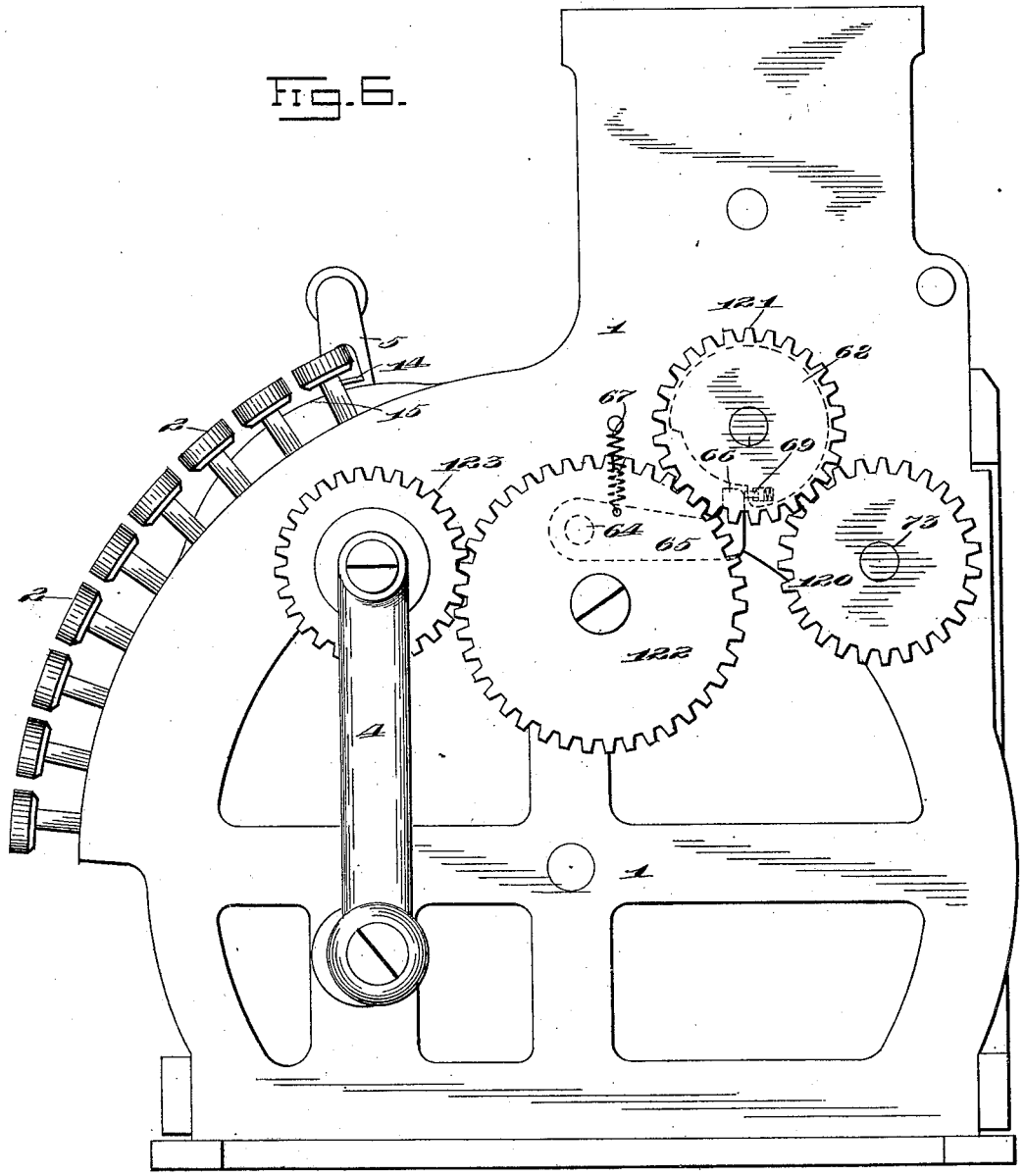

No. 654,226. Patented July 24, 1900.
T. CARROLL.
CASH REGISTER.
(Application filed Oct. 9, 1899.)
(No Model.) 8 Sheets—Sheet 7.
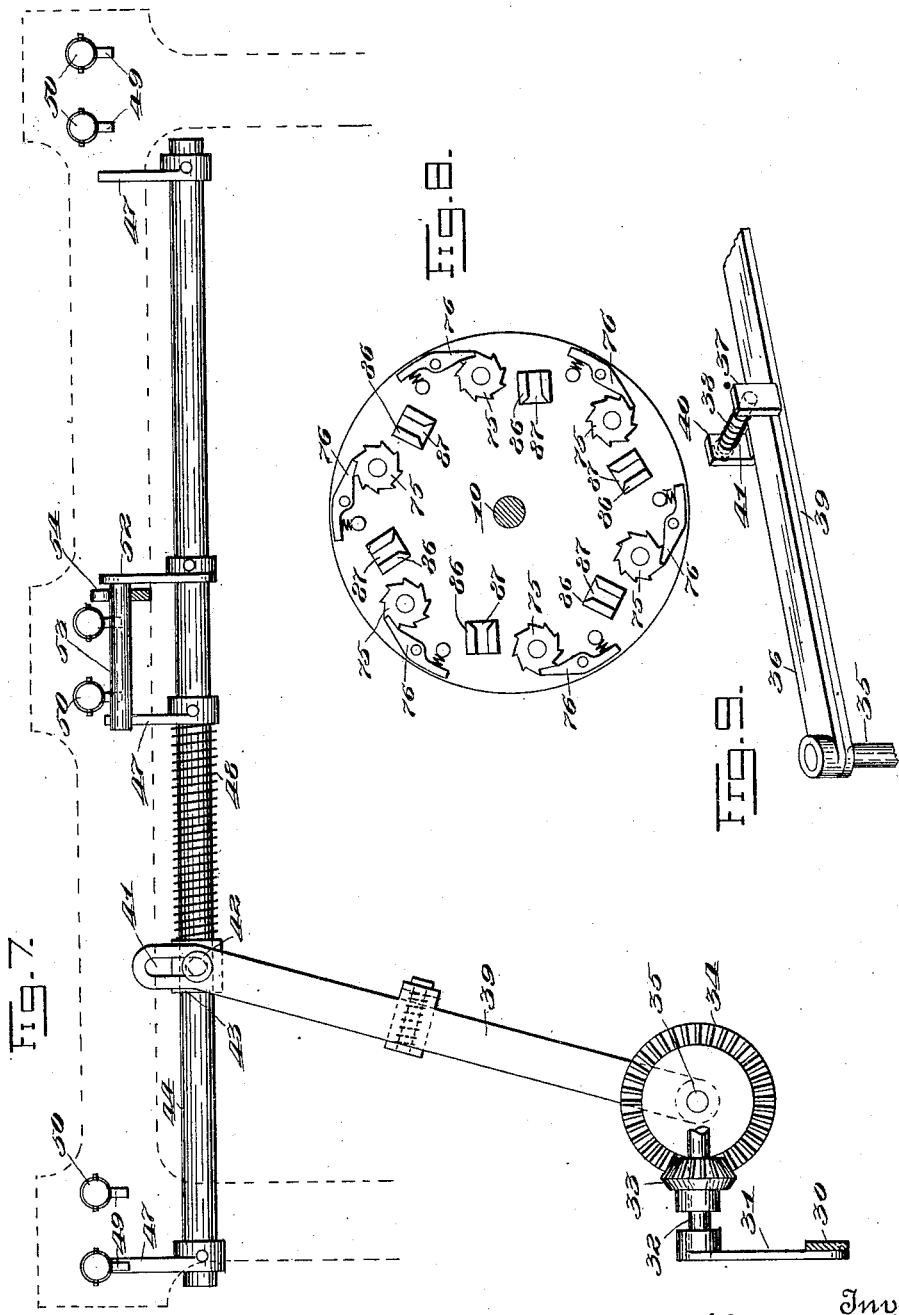

No. 654,226. Patented July 24, 1900.
T. CARROLL.
CASH REGISTER.
(Application filed Oct. 9, 1899.)
(No Model.) 8 Sheets—Sheet 8.

Witnesses
Wm. McCarthy
Wm. H. Muzzy

Inventor
Thomas Carroll
By Alvan Macauley
Attorney

UNITED STATES PATENT OFFICE.

THOMAS CARROLL, OF DAYTON, OHIO, ASSIGNOR TO THE NATIONAL CASH REGISTER COMPANY, OF JERSEY CITY, NEW JERSEY.

CASH-REGISTER.

SPECIFICATION forming part of Letters Patent No. 654,226, dated July 24, 1900.

Application filed October 9, 1899. Serial No. 733,067. (No model.)

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

My invention relates to improvements in cash-registers. The drawings show a well-known type of cash-register to which my invention has been applied.

One object of my invention is the application to a printing cash-register of means for recording the different classes of transactions upon separate paper record-strips, or where the machine is operated by a number of persons to record upon the different strips the transactions of the different persons operating the machine.

A further object of my invention is to provide a plurality of cash-drawers, so that each person operating the machine may have a separate one in which to deposit his receipts.

A third object of my invention is to combine in a machine of the class described the plurality of record-strips with a plurality of cash-drawers.

Figure 1:
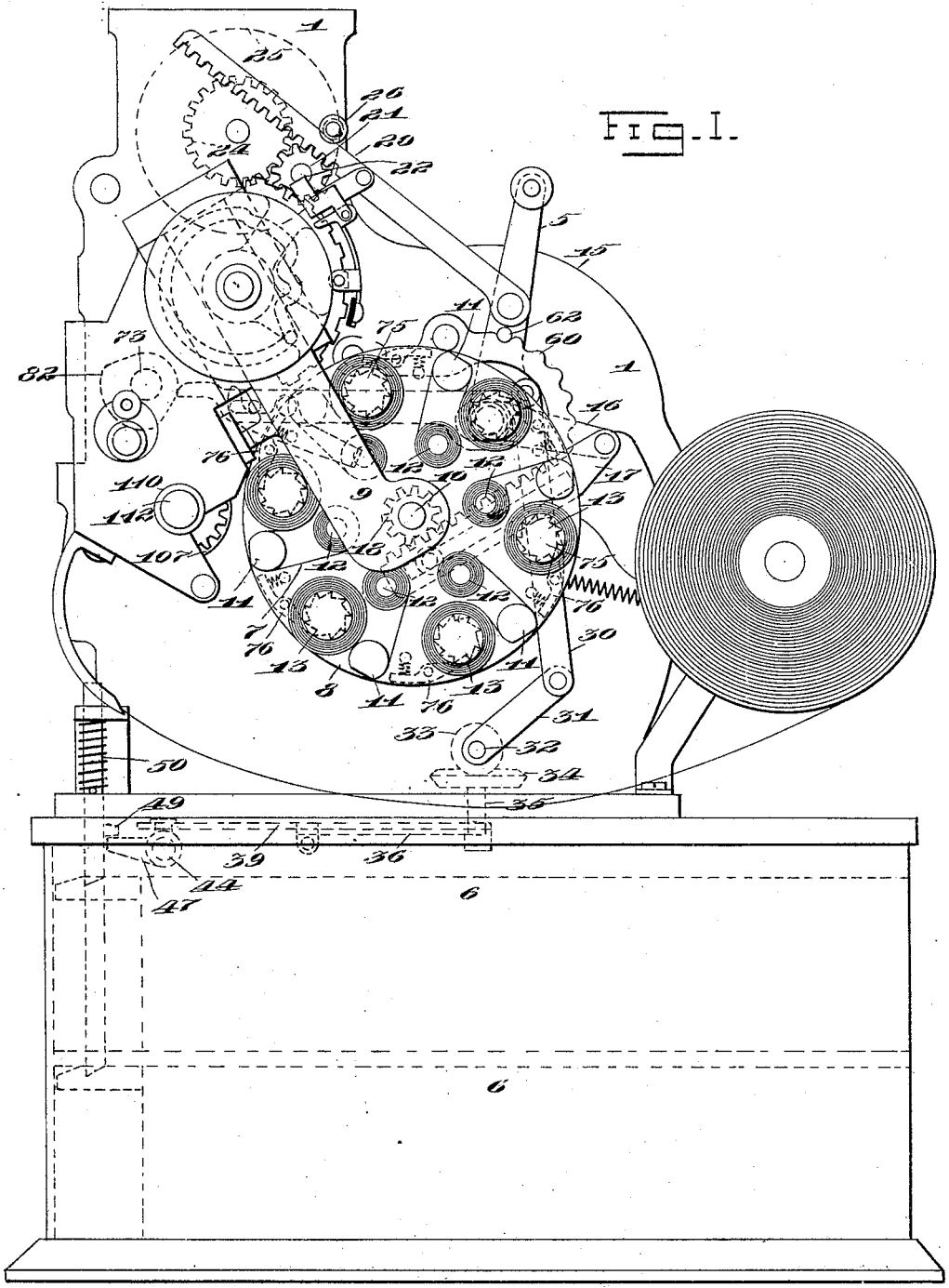
Figure 13:
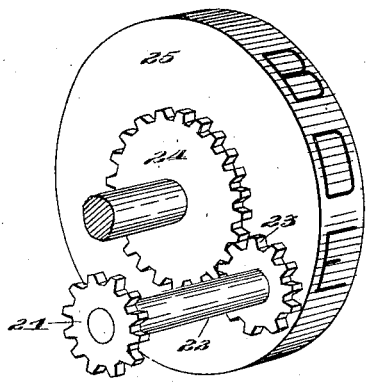
Figure 14:
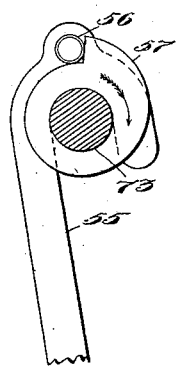
Figure 15:
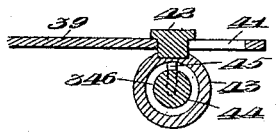

In the appended drawings, forming part of this specification, Figure 1 represents a side elevation of the devices embodying my invention applied to a machine of the type patented to Messrs. Cleal and Reinhard April 13, 1897, and numbered 580,378, the case of said machine being removed. Fig. 2 represents a front elevation of the said devices, the same being broken away in the middle. Fig. 3 represents a vertical transverse section through said devices on the line *x x* of Fig. 2. Fig. 4 represents a view similar to Fig. 2, taken at about the middle of the machine, the cash-drawers being omitted. Fig. 5 represents a view similar to Fig. 4, taken on the line *z z* of Fig. 2, the cash-drawers being omitted. Fig. 6 represents an end elevation of the machine with my invention applied thereto, taken at the opposite end from that shown in Fig. 1, the cash-drawers being omitted. Fig. 7 represents a detail top plan view of the setting and operating devices for the drawer-releasing latches. Fig. 8 represents a detail side elevation of the inner side of the disk-plate carrying the detail strips. Fig. 9 represents a detail perspective view of the shifting or setting levers for the latch-operating devices, the same being shown in an inverted position. Fig. 10 represents a detail perspective view of one of the check-strip-feeding rollers. Fig. 11 represents a detail vertical section through the knob for adjusting the feeding-roller. Fig. 12 represents a detail side elevation of the end of the eccentric shaft for said roller. Fig. 13 represents a detail perspective view of the special indicator and its operating gearing. Fig. 14 represents a detail side elevation of the latch-operating hook-bar and its operating-cam, and Fig. 15 represents a detail vertical section through the latch-operating rock-shaft and the operating-sleeve mounted thereon.

In the drawings the numeral 1 represents the frame and various fixed parts of the machine; 2, the amount or value keys; 3, the amount-indicators; 4, the operating-handle; 5, the lever for setting the disk carrying the detail strips, and 6 the cash-drawers.

The several parts of the register, including the keys, amount-indicators, totalizing-counter, operating-segments, printing-segments, and connections with the operating-handle, are substantially as described in the said patent, to which reference is therefore made for a detail description of such parts and their mode of operation. In the machine shown in said patent the printing-platen is reciprocated by means of a stud which it carries and which slides in a cam-groove in a rotary disk. Said disk is arranged to make a complete revolution each time the cash-register is operated, and the configuration of the cam-groove therein is such that the printing-platen is twice raised to bring the platen against the printing-type during every operation of the machine. When the platen is first raised, the paper check which rests upon and covers the platen and the record-strip is forced against the printing-types and is thereafter cut off and ejected. When the platen is raised the second time, the record-strip is forced against the printing-types, and thereby there is printed upon it a duplicate of the impression made upon the previously-printed check. In the present embodiment of my invention this same operation and sequence is maintained, though it is by no means essential to the carrying out of my invention. My invention, however, comprises the use, in combination with the printing-types, of a number of record-strips instead of only one, and the adjusting-lever 5 is provided, by means of which one or the other of the detail strips may be brought into position where it will be subsequently forced against the printing-types by the operation of the operating crank or handle.

A second feature of my invention consists in the provision of multiple cash-drawers. As applied to cash-registers multiple drawers are not broadly new, and my invention therefore consists in the means which I have employed; also, in the combination of the multiple detail strips with multiple drawers, whereby when a transaction of a particular class is recorded upon the appropriate detail strip the corresponding cash-drawer is automatically opened.

As shown in the drawings, the check-strip, the means for feeding it between the platen and the printing-types, and the means for printing, severing, and ejecting the check are all substantially identical with those shown in said Cleal and Reinhard patent. Instead, however, of a single stationary platen I provide a platen frame or carriage in the form of a revoluble disk 8, which is journaled upon a short shaft 10, the latter being secured at its left-hand end to and carried by the platen-carrying slide 9. The disk 8, as better shown in Fig. 1, carries a series of six spaced platens 11, a series of six record-strip-supply rollers 12, and a series of strip feeding or receiving rollers 13. The record-strips 7 pass from the supply-rollers 12 over their respective platens 11 and thence to their respective receiving-rollers 13. The platens are covered with any suitable elastic material and by rotating the platen-carriage may be successively brought into printing position, so that when the slide 9 is subsequently raised an impression will be made by the type-segments upon that detail strip which is in printing position. The platen-carriage is rotated to set the desired detail strip to receive an impression by the aforesaid selecting-lever 5, which is suitably pivoted upon a short shaft 150, which is rigidly secured at its right-hand end to the fixed frame of the machine and is provided near its upper end with an index finger or pointer 14, arranged to play over an index-plate 15, so that the movements of the lever may be made according to graduated indications on said plate. (See Fig. 2.) Said lever, as shown in Figs. 2 and 3, is provided at its lower end with a sleeve 151, which turns upon the short shaft 150 and at its left-hand end carries a crank-arm 16, to which is jointed at 152 a slotted rack-bar 17, meshing with a pinion 18, fast to the disk 8. The rack-bar is held to continuous mesh with said pinion by an anti-friction-roller 19, mounted on the main frame and projecting through the slot of said bar.

The journal of each of the receiving or feeding rollers 13 extends through the disk 8 and is provided upon the inner side of the latter with a ratchet-wheel 75, as better seen in Fig. 8. These ratchets are engaged by a series of retaining-pawls 76, mounted on the disk 8, and thus all retrograde movement of the receiving-rollers is prevented. The ratchet-wheel of the strip which is in printing position is fed forward one tooth just before the printing takes place in order to bring into position a blank part of the record-strip by a pivoted pawl 77, mounted on a reciprocating slide 78. The latter is slotted, as at 79 and 80, and straddles the sleeve 151 at its forward end and the pin 81 near its rear end. It is thus supported in position. When the slide is moved forward by a cam 82, mounted on the shaft 73, it carries the pawl 77 with it. This movement causes the cam end 83 of said pawl to engage the pin 81, and thus rock the forward end of the pawl up into position to engage the teeth of the ratchet-wheel 75 (shown in broken lines in Fig. 3) of the detail strip which is in printing position. As the slide continues to move forward the pawl engages the under side of the ratchet and turns it forward one tooth. The slide and pawl do not move back until the disk has been moved up to effect the printing, when they are free to return without contacting with the ratchet-wheel. The slide is drawn back to normal position by a coil-spring 84, connected to the main frame, while the pawl 77 is normally drawn downward by a coil-spring 85, also connected to the main frame.

To aline the platen-carriage to bring the level face of the platen squarely against the printing-types, I provide the inner side of the disk 8 with six alining blocks 86—that is, one for each of the six platens (see Fig. 8)—and each alining block has a flaring groove 87 formed therein. The alining-lever 88 is pivoted about centrally to the main frame and at its forward end carries a stud 89 of diameter to permit it to slide through the groove 87. At its rear end the alining-lever is connected by a link 91 to the pivoted operating-lever 90. (See Fig. 3.) At its rear end said operating-lever is provided with a roller 92, which rests against the periphery of the snail-cam 93, fast upon the rotation-shaft 73, whereby as said cam is completely revolved once during each operation of the cash-register the said operating-lever is likewise vibrated once during such operation of the register. The cam 83 begins to move as soon as the driving-crank 4 is started, and consequently, as will be readily understood, the front end of the alining-lever 88 is immediately depressed, causing the stud 89 to enter the groove 87, and thereby adjust the platen-carriage to hold it in exactly the proper position to bring the flat face of the platen against the printing-types. Of course the stud 89 will engage one or the other of the six alining blocks, according to the particular platen which is to receive the impression from the printing-types.

The forward end of the lever 90 is formed with a pendent cam projection 94, arranged to coöperate with an antifriction-roller 95, mounted on the slide 96, which controls the feeding of the check-strip. This slide is formed at its forward end with a segmental extension 97, which projects into proximity to pins 98, mounted, respectively, on a series of special keys 99, so that when the latter are operated said slide will be forced inward to bring the roller 95 into the path of the cam projection.

Lying close beside the slide 96 is a second slide 103, which is jointed at its rear end to a short crank 105, which is secured upon the eccentric journal-shaft 106. At their forward ends both the slides 96 and 103 are provided with slots 102, through which passes a headed pin 101, mounted on the main frame, and thereby the slides are movably supported in position. The slide 96 is only about half as long as its neighboring slide 103, and at its rear end, about midway between the ends of the slide 103, it has mounted upon it a pin 100, which passes through a slot 102$^a$, formed in the slide 103.

When one of the three special keys is pressed inward, its pin 98 moves the slide 96 against the tension of a coil-spring 108, which connects it with the slide 103. This action brings the roller 95 into the path of the cam projection 94, so that when the lever 90 is moving downward by its cam 93 said cam projection will force the roller and slide 96 rearward. As the pin 100 traverses the entire length of the slot 102 upon the initial movement of the slide 96, caused by pressing a special key, the subsequent movement of said slide caused by the operation of the crank 4 will carry the slide 103 with it. The movement of the slide 103, as before stated, rocks the eccentric shaft 103, and thus forces the roller 107 against the feeding-roller 108$^a$ to effect the feeding of the check in a manner well known in the art and disclosed in the aforesaid patent. By this means a check is issued whenever a special key is pressed. This operation takes place even though the controlling knob or sleeve 110 on the eccentric shaft is turned to prevent the issue of checks. Near the end of the registering movement the operated special key is released and springs back to normal position and of course retracts its pin 98, whereupon the slides 96 and 103 are drawn forward to normal position under the impulse of the spring 103$^a$, which connects the slide 103 with the main frame, Fig. 3. This operation of course turns the eccentric shaft 106, upon which one of the feed-rollers is journaled, thereby separating the feed-rollers and partly disengaging the gear-wheels which connect said rollers. (Shown in broken lines in Fig. 3.)

From the description heretofore given it will readily be understood that when the selecting-lever is moved to bring the index-finger 14 opposite one of the designating characters of the index 15 the movement of the selecting-lever will of course be transmitted through the arms 16 to the rack-bar 17, which in turn moves the pinion to partly rotate the platen-carriage and to bring the proper detail strip into printing position.

The six designating characters upon the special indicator 25 correspond, respectively, with the six detail strips and with the six designating letters of the index-plate 15, whereby when the index-finger, for example, is opposite to or points at the letter "A" of the index-plate, as shown in Fig. 2, the letter "A" of the special indicator will show through the regular sight-opening in the case of the machine, and the detail strip which is appropriated to transactions of the department "A" or to transactions recorded by clerk "A," as the case may be, will be brought into printing position and will receive finally the printed impression. The adjustment of the special indicator is accomplished by means of the rack-lever 20, which at its lower or forward end is pivoted to the selecting-lever and at its other end is held in engagement with the pinion 21 by the antifriction-roller 26. The pinion 21 is fast to the left-hand end of a short shaft 22, which is journaled in the main frame. At its right-hand end this shaft, Fig. 13, carries a second pinion 23, which meshes with the gear-wheel 24, which is carried by the special indicator 25, so that the selecting-lever when moved sets the special indicator through the direct connection just described, as will be readily understood. The special printing-segment or type-carrier is also set directly from the selecting-lever through the rack-bar 20, to which, Fig. 3, is centrally pivoted the upper end of the link 27, the lower end of which is pivoted to a collar secured upon the right-hand end of the sleeve 28, which half-surrounds and is journaled upon the outermost of the sleeves 28$^a$ of the regular printing-segments, Figs. 2 and 3. Upon the left-hand end of the sleeve is rigidly secured and carried the special printing-segment, which bears six printing-types corresponding to the six characters of the index-plate 15, and the machine is so arranged that one or the other of these types shall print upon the detail strip whenever the machine is operated.

Another feature of my invention relates to the series of multiple drawers, which, like the other features heretofore described, is capable of use independently or in combination with one or more of the others. In the present instance I have shown the selecting-lever 5 as arranged also to predetermine which cash-drawer shall be opened upon the succeeding operation of the driving-crank 4. As there are six designations upon the index-plate, &c., there are provided, of course, six cash-drawers, arranged two tiers deep, three drawers to each tier. Fig. 7 shows the six vertical drawer-plungers 50, which in the usual manner engage brackets 51, one of which is carried by each drawer. In the present instance, and purely for convenience, the drawer-plungers are arranged in three pairs, a middle pair and a pair at either end. Extending transversely of the machine and journaled in suitable brackets secured to the main frame is the adjusting-bar 44, which is equidistant from the several drawer-plungers 50. Rigidly secured to it are three radial arms 47, which respectively coöperate with the three pairs of drawer-plungers. Immediately above the rear ends of the radial arms each drawer-plunger is provided with a shoulder 49. The adjusting-bar 44 has a double movement—first a sliding or shifting longitudinal movement and subsequently a rocking movement. As the adjusting-bar is shifted longitudinally the arms 47 pass under the shoulders 49 on the drawer-plungers, and whenever the selecting-lever 5 is stopped at any of the six designations of the index-plate some one of the arms 47 will be stopped just under the shoulder 49 of its coöperating drawer-plunger 50. When subsequently the selecting-bar is rocked, the said arm 47 will strike the shoulder 49, and thereby raise the drawer-plunger out of engagement with the drawer-bracket 51, and thereby release the drawer.

To shift the adjusting-bar to its six different positions, I pivot to the selecting-lever a downwardly-extending link 30, which at its lower end is jointed to the crank-arm 31 upon the left-hand end of a short shaft 32, journaled in the main frame, and upon the other end of which is secured the bevel-pinion 33, which meshes always with the bevel-gear 34, which is secured upon the upper end of the short vertical shaft 35.

It will be readily understood that when the selecting-lever is moved, through the link 30 and the crank 31, the pinion 33 will be turned, which will turn also the beveled gear 34. The latter will turn the shaft 35, which will swing the arm 39, so as to slide the shifting bar 44 longitudinally. To prevent a possible strain on the drawer-adjusting parts by a sudden jerky movement of the selecting-lever 5, I have provided a flexible connection between the short vertical shaft 35 and the shifting bar 44. It is shown in Figs. 7 and 9 and comprises the short arm 36, which is rigidly secured at one end to the lower end of the vertical shaft 35. Near its other end it has a downwardly-extending ear 37. The arm 39 is journaled on the shaft 35 above the arm 36 and has also a downwardly-extending ear 40. A stop-pin 38, headed on its free end, passes freely through the ear 40 and is secured to the ear 37. Surrounding the pin 38 and abutting at opposite ends the ears 37 and 40 is a coil-spring, which tends normally to push the ears apart. When the adjusting-lever is moved, the first effect is to move the arm 36, which promptly compresses the coil-spring 41 and when the spring is compressed moves the arm 39 and shifts the rod 40. When the arm 36 comes to rest, the spring 41 immediately expands and continues to move the arm 39 until stopped by the headed stop-pin 38.

To permit the shifting and the rocking of the rod 44, the rear end of the arm 39 is provided with a slot 41, through which a headed pin passes, which is secured at its lower end, Figs. 7 and 15, to a block 43, which is incapable of longitudinal movement on the rod 44, but at the same time permits the shifting rod to be rocked freely. This result is accomplished by means of the pin 45, which is mounted in the shifting bar so that its free end projects into the interior annular groove 346, formed in the block 43, from which it results that when the arm 39 is swung upon its center it shifts the rod 44, the pin 42 meanwhile playing in the slot 41. When the shaft is rocked, the arm 39 remains stationary and the pin 45 plays in the annular groove 346, as will be readily understood. A coil-spring 48, which acts torsionally, is secured at one end to the middle one of the arms 47 and at its other end to the block 43, whereby when said shaft is rocked the spring is thereby put under tension, and when said shaft is released it exerts its tension to restore the said bar to normal position.

Fig. 7 shows the shifting bar in its extreme left-hand position, in which position, as shown in Fig. 2, the index-finger 14 is opposite to or points at the designating initial "A." The letter "A" is in position to show through the slight opening in the machine. The special type-segment 29 is in position to print the letter "A" upon the detail strip and the "A" detail strip is in printing position. If the selecting-lever be moved down, so that the index-finger is opposite the letter "B" on the index-plate, the shifting rod 44 will have been moved to the right, so that the middle one of the arms 47 will be under the shoulder 49 of the first of the left-hand one of the middle pair of drawer-plungers, and consequently upon a subsequent operation of the actuating crank-handle 4 the middle one of the top tier of drawers will be opened. If the selecting-lever 5 be moved down another unit, so that it is opposite the letter "D," the shifting rod will be moved farther to the right, so that the left-hand arm 47 will be under the shoulder of the left-hand one of the right-hand pair of the drawer-plungers. If the selecting-lever be moved down to its next or fourth position, the left-hand arm 47 will be moved to the right just far enough to bring it squarely under the right-hand one of the left-hand pair of drawer-plungers, and so on through the other positions of the selecting-lever.

The rocking of the shifting rod 44 is accomplished, as has been said, by means of the crank 4, which in the manner described in the patent heretofore referred to is arranged to give the transverse shaft 73 a complete revolution at each operation of the machine. Secured upon said latter shaft is a cam 57, upon which rests an antifriction-roller 56, carried by the drawer-plunger-lifting bar 55, which at its upper end hooks over the shaft 73. Its lower hook, Fig. 4, engages under a short transverse rod 53, Fig. 7, which at its right-hand end is secured to the swinging end of a crank-arm 52, which is carried by the shifting bar 44. It results from this construction that whenever the operating-crank 4 is turned the snail-cam 57 raises the drawer-plunger-lifting bar 55, which swings upward and forward the crank-arm 52, thereby rocking the shifting bar 44, to which it is secured, and consequently raising one or the other of the drawer-plungers, according to the position of the selecting-lever.

As an additional means for alining the various parts controlled by the selecting-lever 5 and to enable the operator more readily to stop the selecting-bar at its different designating positions, I provide the curved alining-lever 60, which is secured rigidly upon the left-hand end of the transverse rock-shaft 64$^a$. An important function of the alining-bar is also to lock the machine except when the selecting-lever is exactly in one of its proper positions, or, in other words, to prevent the operating-crank being started when the selecting-lever is intermediate two of its proper positions. To this end the curved front edge of the alining-bar 60 is serrated, as shown in Fig. 3. At its rear end it has a nose 61, which normally rests under and against the nose 63, which is secured upon a transverse shaft 64, which extends entirely through the machine. The right-hand end of said shaft is shown in broken lines in Fig. 6, from which it will be seen that a locking-dog 65 is rigidly secured thereon and a coil-spring 67 holds the locking-tooth 66 of said dog normally in a deep notch formed in the periphery of a locking-disk 68, which is carried by the gear-wheel 121, the latter being one of the train of gears which transmits motion from the driving-crank 4 to the various parts of the machine. Said gear, and consequently the locking-disk 68, is arranged to make a complete revolution at each operation of the machine. The spring 67, as will be noticed, also tends always to depress the nose 63, Fig. 3, which contacting with the rear nose of the alining-lever 60 holds the serrated edge of the latter with a spring-pressure at all times against the roller-stud 62. The wall of the deep notch referred to in the cam 68 has projecting from it a spring-pressed plunger 69, Fig. 6, which normally presses against the end of the locking-tooth 66. If now the selecting-lever be moved even slightly, the roller-stud 62 in passing out of its depression in the serrated edge of the alining-lever 60 will depress the latter, thereby rocking the shaft 64 and swinging the locking-dog 65 downward, whereupon the spring-plunger shoots out and prevents the locking-dog from returning to locking position, and thereby leaving the machine free to be operated; but it will be noticed that it results from the construction just described that after a registration has been completed the machine is automatically locked until after the selecting-lever is moved. The purpose of this arrangement is to prevent a clerk or other person operating the machine from recording upon the wrong detail strip, because before he can operate the machine at all he must move the selecting-lever, and he will thereby be reminded to move it so that the index-finger will be opposite his own designating-letter on the index-plate. Fig. 5 illustrates the devices I employ to prevent the operation of the machine except when one of the platens is in the proper printing position; otherwise a clerk might operate the machine without securing a printed record on any of the paper strips by simply moving the lever 5 so that the roller-stud 62 would be on top of one of the projections of the serrated edge and then turning the operating-crank 4, for in this position no one of the platens would be in printing position. To prevent this misoperation of the machine, I provide the transverse rotation shaft 73 with a locking-disk 72, having a notch, as shown in Fig. 5. Coöperating therewith is the nose 71 on a locking-lever 70, which is rigidly secured at its front end upon the before-mentioned transverse rock-shaft 64$^a$. The nose 71 is normally disengaged from the notch in the locking-disk 73; but whenever the selecting-lever is moved over one of the projections of the serrated alining-lever 60 the said locking-nose is thereby rocked into the notch of the locking-disk 72 and the machine cannot then be operated until the selecting-lever is further moved so that the stud of the selecting-lever is again in a depression of the serrated edge of the alining-lever. The locking-lever 70 and its coöperating locking-disk 72 also operate to prevent movement of the selecting-lever after the movement of the actuating-crank 4 has begun, as will be readily understood, because as soon as the actuating-crank is started the locking-disk immediately turns, so that the locking-nose 71 cannot then enter the locking-notch, but is stopped against the periphery of the disk. Therefore the selecting-lever cannot be moved until the registration is completed and the actuating-crank fully returned to normal position.

The knob 110 for controlling the feeding of the check-strip, as best shown in Figs. 1, 10, 11, and 12, is mounted loose upon the protruding left-hand end of the before-mentioned shaft 106 and is normally forced inward by a coil-spring 111, resting against an inside shoulder, Fig. 11, of the same and held in position by a screw-cap 112, which screws upon the end of the shaft. The inner end of the sleeve is formed with two notches 113, in which a projection 114 of the main frame is arranged to become seated to hold the knob in either the "on" or "off" positions to which it may be turned. The sleeve, further, is provided with an inwardly-projecting pin 115, which projects into a T-groove 116, formed in the outer end of the shaft 106. When the sleeve is in its normal position, the shaft 106 is free to turn independently of the same, as the pin 115 can play in the central annular portion of the T-groove, but when the sleeve is drawn out to disengage it from the projection 114 the pin 115 enters the longitudinal portion of the T-groove, and thus couples the shaft and sleeve together, so that when the latter is turned the shaft will be rocked; and thus either force the roller 107 into contact with the roller 108ª or withdraw it from said contact in the same manner as before described in connection with the slide 103.

Having thus described my invention, what I claim as new, and desire to secure by Letters Patent, is—

1. In a cash-register the combination with a printing mechanism, of a platen-carrier bearing independent record-strips, and means for adjusting said platen-carrier to bring any desired one of the platens and strips into coöperative relation with the printing mechanism.

2. In a cash-register the combination with a printing mechanism, of a carriage bearing a series of independent record-strip devices and means for adjusting said carriage to bring any desired one of said devices into coöperative relation with the printing mechanism.

3. In a cash-register the combination with a printing mechanism, of a carriage bearing a series of independent record-strips, and means for simultaneously moving all of said strips to bring any one into coöperative relation with the printing mechanism.

4. In a cash-register the combination with a printing mechanism, of a series of independent record-strip devices, means for setting any one of said devices to coöperate with the printing mechanism, and a special printing-segment connected to the setting means and arranged to be set thereby.

5. In a cash-register the combination with a printing mechanism, of a series of independent record-strip devices, means for setting any one of the said devices to coöperate with the printing mechanism, and a special indicator connected to said setting means to be set thereby.

6. In a cash-register the combination with a printing mechanism, of a rotary carriage bearing a series of record-strip devices, a pinion mounted on said carriage, a pivoted selecting-lever and a rack connected to said lever and engaging said pinion.

7. In a cash-register the combination with a printing mechanism, of a carriage bearing a series of platens and record-strip-feeding devices, means for adjusting the carriage and means for moving it to and from the printing mechanism.

8. In a cash-register the combination with a printing mechanism, of a series of record-strip devices, a lever for adjusting any one of said devices to coöperative relation with the printing mechanism, and a locking device for the machine controlled by the said lever.

9. In a cash-register the combination with a printing mechanism, of a carriage bearing a series of record-strips, a lever for adjusting any one of said strips into coöperative relation with the printing mechanism, and locking means for preventing operation of the machine until said lever has been moved.

10. In a cash-register the combination with a printing mechanism, of a series of independent record-strip devices, mounted on a movable frame, a series of cash-drawers, a drawer-releasing mechanism, and a lever for both moving the frame and setting the drawer-releasing mechanism.

11. In a cash-register the combination with a printing mechanism, of a series of independent record-strip devices, a lever for setting any one of said devices to coöperate with the printing mechanism, and an alining and locking lever connected to the movable parts of the machine and engaging the setting-lever.

12. In a cash-register the combination with a printing mechanism, of a frame or carriage bearing a series of platens and a series of supply and feeding rollers for independent record-strips, and means for adjusting the frame to bring any one of the platens into coöperative relation with the printing mechanism.

13. In a cash-register the combination with a printing mechanism, of a frame carrying a series of independent detail record devices, a lever for moving said frame to bring any one of said devices into coöperative relation with the printing mechanism and a lock for the machine controlled by said lever.

14. In a cash-register the combination with a printing mechanism, of a frame carrying a series of independent record-strip devices, means for adjusting the frame to bring any one of said devices into coöperative relation with the printing mechanism and an alining device for said frame arranged to be operated independently of the said adjusting means.

15. In a cash-register the combination with a printing mechanism, of a series of independent record-strip devices, means for adjusting said devices to bring any one into coöperative relation with the printing mechanism, and alining devices for alining the record-strip devices.

16. In a cash-register the combination with a printing mechanism, of a series of independent detail record devices, means for adjusting said devices to bring any one into coöperative relation with the printing mechanism, and devices movable independently of the adjusting means for alining the detail record devices.

17. In a cash-register the combination with a printing mechanism, of a series of cash-drawers, latches for said drawers, operating mechanism for said latches, a series of independent detail record devices, and a single selecting means for adjusting the latch-operating mechanism and the record devices.

18. In a cash-register the combination with a printing mechanism, of a series of independent record-strip devices, a series of cash-drawers, latches for said drawers, latch-operating mechanism, a lever for setting both the record devices and the latch mechanism and a common means for operating said latch mechanism and the record devices.

19. In a cash-register the combination with a printing mechanism, of a series of independent record-strip devices, a special indicator, a special printing-segment, multiple cash-drawers, latch mechanisms for said drawers and a common means for setting the strip devices, the indicator, the special printing-segment and the drawer-latch mechanism.

20. In a cash-register the combination with a printing mechanism, of a series of independent record-strip devices, adjusting means for bringing any one of said devices into coöperative relation with the printing mechanism, and means connected to the movable parts of the machine for feeding the record-strip device after it has been adjusted to operative position.

21. In a cash-register the combination with a series of cash-drawers, of independent latches for said drawers, a longitudinally-movable rock-shaft carrying arms for operating said latches, a pivoted lever for moving the shaft longitudinally, a second lever having a flexible spring connection with said first-mentioned lever, and means for adjusting said second lever according to the drawer to be operated.

22. In a cash-register the combination with a series of cash-drawers, of independent latches for the same, a longitudinally-movable rock-shaft having arms for operating said latches, a lever for moving said shaft longitudinally, a second lever having a flexible connection with the first-mentioned lever, and a setting device connected to said second lever for operating the same.

23. In a cash-register the combination with a printing mechanism, of a frame carrying a series of independent record-strip devices and a series of alining devices, means for setting any one of said record-strip devices for coöperation with the printing mechanism, and an alining-lever connected to the movable parts of the machine and coöperating with the alining devices of said frame.

24. In a cash-register the combination with a printing mechanism, of a frame carrying a series of independent record-strip devices and a series of blocks having alining grooves, means for moving the frame to bring any one of the record-strip devices into coöperative relation with the printing mechanism, and a pivoted lever connected to the movable parts of the machine and carrying a pin which enters the grooves of the alining-blocks when the machine is operated.

25. In a cash-register the combination with a printing mechanism, of a frame carrying a series of record-strip devices comprising feeding-rollers, means for adjusting the frame to bring any one of said devices to operative position, a slide, and a pawl mounted on said slide and arranged to be moved to feed the record-strip which is in operative position with respect to the printing mechanism.

26. In a cash-register the combination with a printing mechanism, of a frame carrying a series of independent record-strip devices and a series of alining blocks, means for adjusting the frame to bring any one of the record-strip devices into operative position, a pivoted lever having a projection arranged to engage said blocks, and a cam and connections for operating said lever.

27. In a cash-register the combination with a printing mechanism, of a rotary frame carrying a series of record-strip devices, a pinion on said frame, a pivoted lever, a rack-bar connected to said lever and meshing with said pinion and a pivoted alining and locking lever engaging and coöperating with the first-mentioned lever.

28. In a cash-register the combination with a printing mechanism, of check-strip-feeding rollers, means for moving one of said rollers toward and away from the other, a slide connected to said means, a second slide coöperating with the first-mentioned slide, keys arranged to give said second slide an initial independent movement, means connected to the movable parts of the machine for giving said second slide its final movement and devices connecting the slides whereby this latter movement is transmitted to the first-mentioned slide.

29. In a cash-register the combination with a printing mechanism, of check-strip-feeding devices arranged to be thrown into and out of operative position, a series of special keys and a slide device controlling the feeding devices and arranged to be set by the special keys.

30. In a cash-register the combination with a printing mechanism, of check-strip-feeding devices arranged to be thrown into and out of operative position, a series of special keys, a slide device for adjusting the feeding devices arranged to be set by the keys and means connected to the movable parts of the machine for operating said slide device.

31. In a cash-register the combination with a printing mechanism, of check-strip-feeding devices arranged to be thrown into and out of operative position, a series of special keys, a slide device for adjusting the feeding devices arranged to be set by the special keys, and a lever adapted to be operated by the movable parts of the machine and having a cam portion for operating said slide device.

32. In a cash-register the combination with a printing mechanism, of a series of independent record-strip devices, means for setting any one of said devices for coöperation with the printing mechanism, and devices for locking said setting means after the operation of the machine has commenced.

33. In a cash-register the combination with a printing mechanism, of a frame carrying a series of independent record-strip devices, a lever for setting said frame, and means for locking said lever after the registering movement of the machine has commenced.

34. In a cash-register the combination with a printing mechanism, of a series of independent record-strip devices, a setting-lever for said devices, a locking-lever for said setting-lever, a rock-shaft for operating said locking-lever, a locking-arm on said shaft and a notched disk coöperating with said locking-arm.

35. In a cash-register the combination with a printing mechanism, of a carriage bearing a series of independent record-strip devices, independent feeding means for said strip devices, and mechanism for adjusting said carriage to bring any desired one of said devices into coöperative relation with the printing mechanism.

36. In a cash-register the combination with a printing mechanism, of a carriage bearing a series of independent record-strip devices, independent feeding means for said strip devices, a common operating mechanism for actuating any one of said feeding means, and mechanism for adjusting said carriage to bring the desired record-strip devices into coöperative relation with the printing mechanism.

37. In a cash-register, the combination with a printing mechanism, of a rotary carriage bearing a series of independent record-strip devices, and means for rotating said carriage to bring any desired one of the record-strip devices into coöperative relation with the printing mechanism.

38. In a cash-register the combination with a printing mechanism, of a rotary carriage bearing a series of independent record-strip devices and a single lever and connections for rotating said carriage to bring any desired one of the record-strip devices into coöperative relation with the printing mechanism.

39. In a cash-register the combination with a printing mechanism, of a carriage bearing a series of platens and a series of independent record-strip devices, and adjusting means for actuating said carriage to bring the proper platen and record-strip device into coöperative relation with the printing mechanism, and means for bringing the platen and printing mechanism together.

40. In a cash-register the combination with a printing mechanism, of a carriage bearing a series of independent record-strip devices, means for adjusting said carriage to bring any desired one of said devices into coöperative relation with the printing mechanism, and means for bringing the printing mechanism and record-strip devices together.

41. In a cash-register the combination with a printing mechanism, of a series of independent record-strip devices, independent feeding means for the respective devices, and means for adjusting any one of said devices into coöperative relation with the printing mechanism.

42. In a cash-register the combination with a printing mechanism, of a series of record-strip devices, means for adjusting any one of said devices into coöperative relation with the printing mechanism, and a locking device for the machine controlled by the said adjusting means.

43. In a cash-register the combination with a printing mechanism, of a series of independent record-strip devices, a series of cash-compartments, independent devices for said compartments for locking the same, and means for bringing any one of the record devices into coöperative relation with the printing mechanism and setting the corresponding compartment-locking device for operation.

44. In a cash-register the combination with a printing mechanism, of a series of independent record-strip devices, a series of cash-compartments, independent devices for said compartments for locking the same, means for bringing any one of the record devices into coöperative relation with the printing mechanism and setting the corresponding compartment-locking device for operation and mechanism controlled by the regular movement of the machine for operating the locking device which has been set.

45. In a cash-register the combination with a printing mechanism, of a series of independent record-strip devices, a series of cash-drawers having independent locks and means for bringing any one of the record devices into coöperative relation with the printing mechanism and setting the corresponding drawer-lock for operation.

46. In a cash-register the combination with a printing mechanism, of a series of independent record-strip devices, a series of cash-drawers, a drawer-releasing mechanism and means for adjusting the desired record-strip device to operative position and setting the drawer-releasing mechanism.

47. In a cash-register the combination with a printing mechanism, of a series of independent record-strip devices, means for setting any one of said devices to coöperate with the printing mechanism, and an alining mechanism connected to the movable parts of the machine and engaging said setting means.

48. In a cash-register, the combination with a printing mechanism, of a series of independent record-strip devices, a lever for setting any one of said devices to coöperate with the printing mechanism and an alining device connected to the movable parts of the machine and engaging the setting-lever.

49. In a cash-register the combination with a printing mechanism, of a series of independent record-strip devices, means for setting any one of said devices to coöperate with the printing mechanism, and mechanism for locking said means against movement during the operation of the machine.

50. In a cash-register the combination with a printing mechanism, of a series of platens and a series of supply and feeding rollers for independent record-strips and means for adjusting any one of the platens and its companion rollers into coöperative relation with the printing mechanism.

51. In a cash-register the combination with a printing mechanism, of a series of independent record-strip devices, means for adjusting said devices to bring any desired one into coöperative relation with the printing mechanism and a lock for the machine controlled by said adjusting means.

52. In a cash-register the combination with a printing mechanism, of a series of independent record-strip devices, a lever for adjusting any one of said devices into coöperative relation with the printing mechanism, and alining devices for said record-strip devices arranged to be operated independently of the adjusting-lever.

53. In a cash-register, the combination with a printing mechanism, of a series of independent record-strip devices, a series of cash-drawers, independent latches for the same, a latch-operating device common to all of the latches and adjusting means for setting any one of the record-strip devices for operation and simultaneously setting the latch-operating device.

54. In a cash-register the combination with a printing mechanism, of a frame carrying a series of independent record-strip devices and a series of alining-blocks, means for adjusting the frame to bring any one of the record-strip devices into operative position, and means connected to the movable parts of the machine and coöperating with the alining-blocks.

In testimony whereof I affix my signature in the presence of two witnesses.

THOMAS CARROLL.

Witnesses:
  JOHN C. LOCKYER,
  JESSE M. SMITH.